United States Patent
Kallal et al.

(10) Patent No.: US 9,711,972 B2
(45) Date of Patent: Jul. 18, 2017

(54) AUXILIARY RECEIVER COIL TO ADJUST RECEIVER VOLTAGE AND REACTANCE

(71) Applicant: QUALCOMM Incorporated, San Diego, CA (US)

(72) Inventors: Edward Kenneth Kallal, San Diego, CA (US); William Henry Von Novak, III, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 14/671,627

(22) Filed: Mar. 27, 2015

(65) Prior Publication Data
US 2016/0285280 A1 Sep. 29, 2016

(51) Int. Cl.
H02J 7/00 (2006.01)
H02J 5/00 (2016.01)
H01F 38/14 (2006.01)
H02J 7/02 (2016.01)
H02J 50/10 (2016.01)

(52) U.S. Cl.
CPC .............. *H02J 5/005* (2013.01); *H01F 38/14* (2013.01); *H02J 7/025* (2013.01); *H02J 50/10* (2016.02)

(58) Field of Classification Search
CPC .................................. H02J 7/025; H02J 5/005
USPC .......................................... 320/108; 307/104
See application file for complete search history.

(56) References Cited

U.S. PATENT DOCUMENTS

| | | |
|---|---|---|
| 2010/0109443 A1 | 5/2010 | Cook et al. |
| 2011/0221388 A1 | 9/2011 | Low et al. |
| 2011/0278945 A1 | 11/2011 | Wheatley, III et al. |
| 2011/0281535 A1 | 11/2011 | Low et al. |
| 2011/0304216 A1 | 12/2011 | Baarman |
| 2012/0242164 A1 | 9/2012 | Teggatz et al. |
| 2012/0267960 A1 | 10/2012 | Low et al. |
| 2013/0094598 A1* | 4/2013 | Bastami ............... H02J 5/005 375/259 |
| 2013/0200717 A1 | 8/2013 | Bourilkov et al. |
| 2013/0214612 A1* | 8/2013 | Bae ...................... H04B 5/0037 307/104 |
| 2013/0257167 A1 | 10/2013 | Singh |
| 2013/0257370 A1 | 10/2013 | Ichikawa |
| 2014/0092649 A1 | 4/2014 | Hsu |
| 2014/0285026 A1* | 9/2014 | Hori ..................... H02J 5/005 307/104 |
| 2015/0035372 A1* | 2/2015 | Aioanei ................ H02J 7/025 307/104 |

FOREIGN PATENT DOCUMENTS

EP 2629395 A2 8/2013

OTHER PUBLICATIONS

International Search Report and Written Opinion—PCT/US2016/020244—ISA/EPO—Jul. 8, 2016—10 pgs.
Second Written Opinion from International Application No. PCT/US2016/020244, mailed Mar. 6, 2017, 5 pgs.

* cited by examiner

*Primary Examiner* — Drew A Dunn
*Assistant Examiner* — Zixuan Zhou

(57) ABSTRACT

In a wireless charging system, a receiver device includes a second coil that performs a reactance shift. The reactance shift may be used to conform the device reactance to a reactance range, or to adjust a rectified voltage of the wireless power provided to the device electronics. The reactance shift differs from resonance matching in that the power transfer efficiency may be decreased.

20 Claims, 11 Drawing Sheets

AUXILIARY RECEIVER COIL TO ADJUST RECEIVER VOLTAGE AND REACTANCE

FIELD

The disclosure relates to inductive power transfer, and in particular, to dynamically adjusting reactance during inductive power transfer.

BACKGROUND

Unless otherwise indicated herein, the approaches described in this section are not admitted to be prior art by inclusion in this section.

The proliferation of battery operated electronic systems, such as smartphones, tablets, or even electric cars, has put increasing demands on charging systems used to transfer power to these systems. For example, mobile devices typically store power in a battery. As the device is used, the energy in the battery is depleted and the battery must be recharged. Typically, mobile devices are connected through a power cable to a wall outlet to receive voltage and current for recharging the battery.

Recently, attempts have been made to provide power to battery operated systems wirelessly so that cumbersome wires and cables are not required for recharging the battery. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

In one aspect, an electronic device includes device electronics, a first coil coupled to the device electronics, a reactance adjustment circuit, a second coil coupled to the reactance adjustment circuit, and a control circuit coupled to the reactance adjustment circuit. The first coil is configured to wirelessly couple power via a wireless power field generated by a transmitter device and to provide a first electrical current based on the power to the device electronics. The device electronics and the first coil have a load impedance, which may include a load reactance. The second coil is configured to wirelessly couple the power via the wireless power field generated by the transmitter device and to provide a second electrical current based on the power to the reactance adjustment circuit. The reactance adjustment circuit and the second coil have a tank impedance, which may include a tank reactance. The tank reactance is adjustable. A device impedance includes the load impedance and the tank impedance, and wherein a device reactance includes the load reactance and the tank reactance. The control circuit is configured to dynamically adjust the tank reactance and in accordance therewith to dynamically adjust the device reactance.

According to a further aspect, the transmitter device has a transmitter impedance, which may include a transmitter reactance. The control circuit is configured to dynamically adjust the tank reactance in order to conform the device reactance to a reactance range for the transmitter reactance of the transmitter device. The control circuit may be configured to receive a control signal from the transmitter device, and to dynamically adjust the tank reactance in response to the control signal.

According to a further aspect, the control circuit is configured to dynamically adjust the tank reactance in order to dynamically adjust a rectified voltage of the power provided to the device electronics. The electronic device may further include a voltage sensor, coupled to the device electronics, that is configured to sense the rectified voltage, and to provide a voltage measurement signal to the control circuit. The control circuit may be configured to receive the voltage measurement signal, and to dynamically adjust the tank reactance in response to the voltage measurement signal.

According to a further aspect, the transmitter device includes a transmitter impedance, which may include a transmitter reactance. The control circuit is configured to selectively operate in a first mode and a second mode, according to a control signal. In the first mode, the control circuit dynamically adjusts the tank reactance in order to conform the device reactance to a reactance range for the transmitter reactance of the transmitter device. In the second mode, the control circuit dynamically adjusts the tank reactance in order to dynamically adjust a rectified voltage of the power provided to the device electronics.

According to a further aspect, the electronic device further includes a resonance matching circuit, coupled to the reactance adjustment circuit, that is configured to adjust the tank reactance in order to adjust a resonant frequency of the electronic device to match a resonant frequency of the transmitter device. The control circuit is configured to deactivate the resonance matching circuit when the resonance matching circuit adjusts the device reactance outside of a defined range.

According to a further aspect, the control circuit is configured to dynamically adjust the tank reactance such that a power transfer efficiency of the wireless power field is decreased.

According to a further aspect, the electronic device further includes a voltage sensor that is configured to detect a rectified voltage of the power provided to the device electronics. The control circuit is configured to dynamically adjust the tank reactance based on the rectified voltage.

The reactance adjustment circuit may include a plurality of capacitors and a plurality of switches. The switches are configured to receive a control signal from the control circuit and to selectively connect at least one of the plurality of capacitors in response to the control signal.

The reactance adjustment circuit may include a plurality of resistors and a plurality of switches. The switches are configured to receive a control signal from the control circuit and to selectively connect at least one of the plurality of resistors in response to the control signal.

The reactance adjustment circuit may include a variable capacitor that has a plurality of selectable capacitances. The variable capacitor is configured to receive a control signal from the control circuit and to select one of the plurality of selectable capacitances in response to the control signal.

In another aspect, a method performs reactance adjustment in a wireless charging system. The method includes receiving power wirelessly, by an electronic device from a transmitter device, via a wireless power field generated by the transmitter device. The electronic device has device electronics, a first coil coupled to the device electronics, a reactance adjustment circuit, a second coil coupled to the reactance adjustment circuit, and a control circuit coupled to the reactance adjustment circuit. The method further includes wirelessly coupling the power and providing, by the first coil, a first electrical current based on the power to the device electronics. The device electronics and the first coil have a load impedance, which may include a load reactance. The method further includes wirelessly coupling the power and providing, by the second coil, a second electrical current based on the power to the reactance adjustment circuit. The reactance adjustment circuit and the second coil have a tank impedance, which may include a tank reactance. The tank reactance is adjustable. A device impedance includes the load impedance and the tank impedance, and a device reactance includes the load reactance and the tank reactance. The method further includes dynamically adjusting, by the control circuit, the tank reactance and in accordance therewith dynamically adjusting the device reactance.

According to a further aspect, the electronic device further comprises a resonance matching circuit. The method further includes adjusting, by the resonance matching circuit, the tank reactance in order to adjust a resonant frequency of the electronic device to match a resonant frequency of the transmitter device. The method further includes deactivating, by the control circuit, the resonance matching circuit when the resonance matching circuit adjusts the device reactance outside of a defined range.

According to a further aspect, the method further includes dynamically adjusting, by the control circuit, the tank reactance such that a power transfer efficiency of the wireless power field is decreased.

In another aspect, a system includes a transmitter device and an electronic device. The transmitter device includes a transmitter coil and is configured to generate a wireless power field. The electronic device includes device electronics, a first coil coupled to the device electronics, a reactance adjustment circuit, a second coil coupled to the reactance adjustment circuit, and a control circuit coupled to the reactance adjustment circuit. The first coil is configured to wirelessly couple power via the wireless power field generated by the transmitter device and to provide a first electrical current based on the power to the device electronics. The device electronics and the first coil have a load impedance, which may include a load reactance. The second coil is configured to wirelessly couple the power via the wireless power field generated by the transmitter device and to provide a second electrical current based on the power to the reactance adjustment circuit. The reactance adjustment circuit and the second coil have a tank impedance, which may include a tank reactance. The tank reactance is adjustable. A device impedance includes the load impedance and the tank impedance, and wherein a device reactance includes the load reactance and the tank reactance. The control circuit is configured to dynamically adjust the tank reactance and in accordance therewith to dynamically adjust the device reactance.

According to a further aspect, the transmitter device has a transmitter impedance, which may include a transmitter reactance. The transmitter device further comprises a reactance detector circuit, coupled to the transmitter coil, that is configured to detect the transmitter reactance and to transmit a control signal to the control circuit. The control circuit is configured to dynamically adjust the tank reactance in response to the control signal.

According to a further aspect, the transmitter device has a transmitter impedance, which may include a transmitter reactance. The transmitter device further comprises a reactance detector circuit coupled to the transmitter coil, a transmitter reactance adjustment circuit coupled to the transmitter coil, and a resonance matching circuit coupled to the reactance detector circuit and the transmitter reactance adjustment circuit. The reactance detector circuit is configured to detect the transmitter reactance. The transmitter reactance adjustment circuit has a transmitter tank reactance, where the transmitter reactance includes the transmitter tank reactance, where the transmitter tank reactance is adjustable. The resonance matching circuit is configured to adjust the transmitter tank reactance in order to adjust a resonant frequency of the transmitter device to match a resonant frequency of the electronic device. The reactance detector circuit is configured to deactivate the resonance matching circuit when the resonance matching circuit adjusts the transmitter reactance outside of a defined range.

According to a further aspect, the electronic device further comprises a resonance matching circuit coupled to the reactance adjustment circuit. The resonance matching circuit is configured to adjust the tank reactance in order to adjust a resonant frequency of the electronic device to match a resonant frequency of the transmitter device. The control circuit is configured to deactivate the resonance matching circuit when the resonance matching circuit adjusts the device reactance outside of a defined range.

According to a further aspect, the control circuit is configured to dynamically adjust the tank reactance such that a power transfer efficiency of the wireless power field is decreased.

In this manner, the power transmitting unit (PTU) (e.g., the transmitter device) need not be designed to operate over a wide reactance range (e.g., above j150 ohms, between j0 and j300 ohms, etc.), and instead may be designed to operate over a narrow reactance range (e.g., between j0 and j150 ohms). This reduces the cost and complexity of the PTU.

According to a further aspect, an electronic device is provided that includes device electronics. The electronic device includes a first means for coupling power via a wireless power field generated by a transmitter device. The first coupling means provides a first electrical current based on the power to the device electronics. The device electronics and the first coupling means have a load impedance. The load impedance includes a load reactance. The electronic device further includes means for adjusting reactance. The electronic device further comprises a second means for coupling power via the wireless power field and to provide a second electrical current based on the power to the reactance adjusting means. The reactance adjustment means and the second coupling means have a tank impedance. The tank impedance includes a tank reactance. The tank reactance is adjustable. A device impedance includes the load impedance and the tank impedance. A device reactance includes the load reactance and the tank reactance. The electronic device further comprises means for dynamically adjusting the tank reactance and in accordance therewith to dynamically adjust the device reactance.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings.

DETAILED DESCRIPTION

Figure 1:
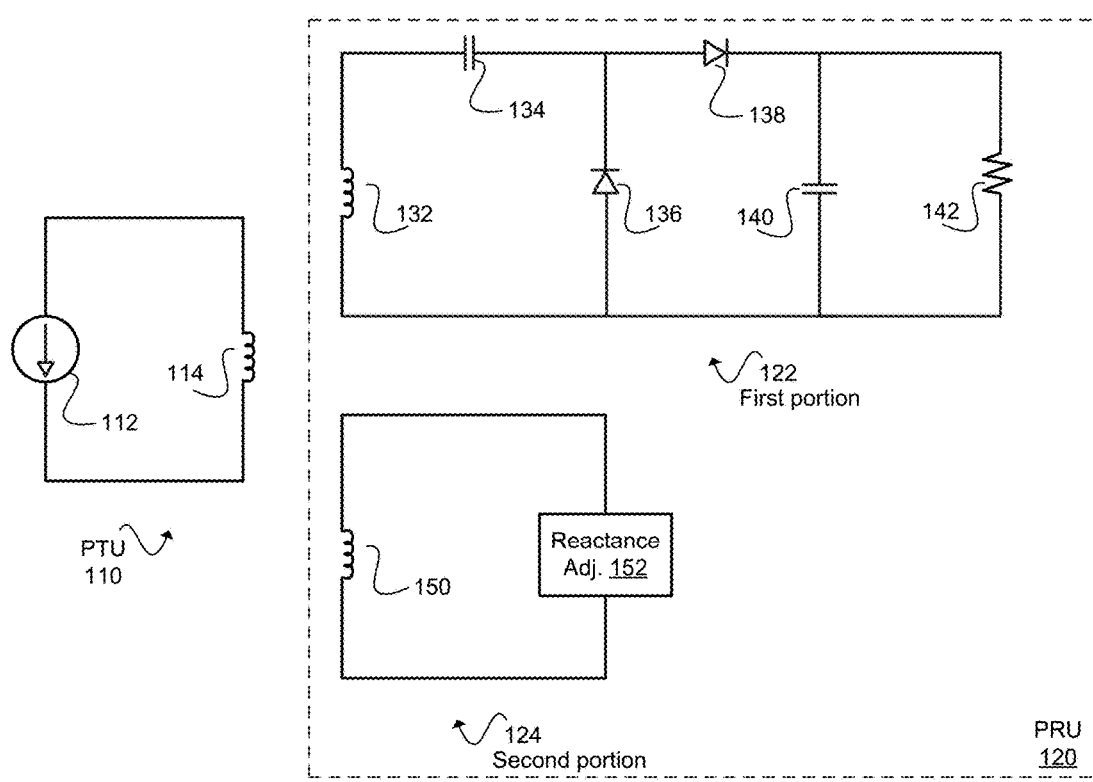
FIG. 1 is a schematic diagram of a wireless charging system.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a receiving antenna (often referred to as a coil or winding) to achieve power transfer.

Wireless charging involves coupling energy from a power source to an electronic system using magnetic fields. The energy from the magnetic fields may be received by the system (e.g., on the order of one or several watts or more) and used to charge a battery. Some systems may even use the received magnetic field energy to power electronics in the system, for example when the device is being operated by a user. A general overview of wireless charging is as follows. A power source provides electrical energy to an inductive coil of a charging platform, referred to as the power transmitting unit (PTU). Current through the inductive coil generates a magnetic field, H, perpendicular to a plane of the coil. The energy in the magnetic field may be captured by another inductive coil in a device to be charged, referred to as the power receiving unit (PRU). The power receiving unit may use the received energy from the magnetic field to operate the device or to charge a battery, for example.

The efficiency of the power transfer from the PTU to the PRU may be improved using resonant coupling. In resonant coupling, the coils in the PTU and PRU are tuned to operate at the same resonant frequency. The tuning may be performed using inductors, capacitors, ferrite, etc.

An example of a wireless charging system that uses resonant coupling is as follows. The PTU and PRU may measure their frequency response and may adjust their capacitance or inductance to adjust the resonant frequency. The PTU may sweep through operating frequencies, measure the current of the transferred power, and may adjust its resonant frequency for maximum power transfer efficiency.

Another example of a wireless charging system that uses resonant coupling is as follows. The PTU and PRU may each include a multi-tap coil that may be tapped dynamically according to operational needs. Depending upon the load of the PRU, the PTU or PRU may change its tap point to adjust its resonant frequency for maximum power transfer efficiency.

In general, a PTU may transfer power to a wide variety of PRUs. Each PRU has its own load and resonant frequency characteristics. For a given PRU, its load and resonant frequency characteristics may change according to its distance from and orientation with the PTU, and its current operational mode (e.g., charging, standby mode operation, transmitter mode operation, etc.). Thus, the PTU needs to be designed to accommodate this wide variety of PRUs. An additional design consideration is that the PTU may provide power to multiple PRUs, each with different load and resonant frequency characteristics. The design for such a PTU requires that the PTU operate over a wide reactance range, for example above j150 ohms due to the range of reactance presented to the PTU by various PRUs.

Before discussing specific examples and implementations, a general discussion of impedance and reactance is provided. Impedance (Z) includes both resistance (R) and reactance (X), symbolically represented as Z=R+jX, where j is the imaginary unit. The measurement for all is ohms (Ω). Reactance is used to compute amplitude and phase changes of a sinusoidal alternating current going through a circuit element. The total reactance X includes the capacitive reactance $X_C$ and the inductive reactance $X_L$:

$$X = X_L - X_C = \omega L - 1/\omega C$$

where ω is the angular frequency, which is 2π times the frequency in Hertz (Hz). Although $X_L$ and $X_C$ are both positive by convention, the capacitive reactance $X_C$ makes a negative contribution to total reactance. Hence, if X>0, the reactance is said to be inductive; if X=0, then the impedance is purely resistive; and if X<0, the reactance is said to be capacitive. The capacitive reactance is an opposition to the change of voltage across an element. The inductive reactance is an opposition to the change of current through an element.

The present disclosure is directed to adjusting reactance, as compared to adjusting resonant frequency for maximum power transfer efficiency. The PRU described below includes an additional coil to adjust its reactance, in order to conform the reactance of the PRU to a narrow range (e.g., j0 to j150 ohms) as presented to the PTU, or to receive a particular rectified voltage from the power transmitted by the PTU. The additional coil is isolated from the main receiver coil by is capable of being inductively coupled to the main receiver coil during operation, but is not mainly intended for coupling power out of the wireless field for providing to a load (e.g., charging a battery).

The additional coil in the PRU is used to adjust the reactance or the received voltage from the PTU. Adjusting the reactance may also be referred to as performing a reactance shift.

Regarding the reactance shift, many wireless power receiver implementations include a metallic device to be charged (DTBC), such as a smartphone or a tablet, as the PRU. The metallic objects change the inductance of the transmitter coil. (Reducing inductance is often referred to as "creating a (negative) reactance shift" or "detuning the transmitter".) Similarly, many wireless power receivers include ferrite to improve coupling. In addition to improving coupling, the ferrite can also increase the inductance of the transmitter coil (e.g., it creates a positive reactance shift).

These reactance shifts add significant complexity to PTU design. Specifically, the power amplifier design would be significantly simplified if the load reactance was always constant (e.g., 50+j0 ohms) or the range of reactance presented to the PTU was reduced. Today, wireless power transmitters are designed to work across wide reactance ranges (e.g., j0-j300 ohms) or high reactance ranges (e.g., j150-j300 ohms).

Regarding the received voltage, all wireless power receivers are designed to operate in a finite voltage range (at the output of the rectifier). Since (1) coupling varies at different positions on a transmitter pad, and (2) PRUs will have disparate power consumption levels, receivers cannot always operate at their "target" voltages. Ensuring that all PRUs can concurrently operate in their allowable voltage ranges is a challenge in wireless power system design.

To address these issues, a second coil (that may be referred to as an auxiliary coil) is added to the PRU, as further described below. Adjusting the reactance on the second coil can adjust the reactance created by the receiver and can adjust the receiver's rectified output voltage.

FIG. 1 is a schematic diagram of a wireless charging system 100. The system 100 includes a PTU 110 and a PRU 120. In one example, the PTU 110 is in the form factor of a charging pad, and is located at a generally stationary position, for example being plugged into an electrical outlet. The PRU 120 is generally mobile, and is placed in proximity to the PTU 110 for wireless charging purposes.

The PTU 110 includes a current source 112 (e.g., as a component of a power amplifier coupled to an electrical outlet) and a transmitter coil 114. The current source 112 powers the transmitter coil 114 to generate a wireless power field. The PTU 110 has an impedance (which may include a reactance), based on the circuit characteristics of the PTU 110. The PTU 110 may include other components that either are described in more detail below or are omitted from the description for brevity.

The PRU 120 includes a first portion 122 and a second portion 124. The first portion 122 generally includes the functional components of the PRU 120. For example, if the PRU 120 is a cellular telephone, the first portion 122 includes the wireless charging components and the cellular telephone components (e.g., a load). The second portion 124 generally includes the reactance adjustment components. The PRU 120 may include other components that either are described in more detail below or are omitted from the description for brevity.

The first portion 122 includes a first coil 132, a capacitor 134, a diode 136, a diode 138, a capacitor 140, and a resistor 142. The components of the first portion 122, excluding the first coil 132, may collectively be referred to as the device electronics of the PRU 120. The first coil 132 wirelessly couples power via the wireless power field and provides an electrical current based on the power to the device electronics. The capacitors 134 and 140, and the diodes 136 and 138, provide a rectified voltage to the resistor 142. The resistor 142 represents the load of the functional components of the PRU 120 (e.g., the battery or other device electronics). Collectively, the components of the first portion 122 have an impedance (which may include a reactance), referred to as the load impedance (and the load reactance). The components of the first portion 122 (e.g., metal components as described above) may cause a reactance shift at the PTU 110 as described above.

The second portion 124 includes a second coil 150 and a reactance adjustment circuit 152. The second coil 150 wirelessly couples the power via the wireless power field and provides an electrical current based on the power to the reactance adjustment circuit 152. The reactance adjustment circuit 152, and the second coil 150, together have an impedance (which may include a reactance), referred to as the tank impedance (and the tank reactance). The tank reactance is adjustable, as described below in more detail. The impedance of the PRU 120 (which may include a reactance) is referred to as the device impedance (and the device reactance). The device impedance is the combination of the load impedance and the tank impedance. The device reactance is the combination of the load reactance and the tank reactance.

The general operation of the system 100 is as follows. The PTU 110 generates the wireless power field, and the PRU 120 receives power wirelessly via the wireless power field. The first coil 132 provides a current based on the power to the device electronics of the PRU 120. The reactance of the reactance adjustment circuit 152 (the tank reactance) is dynamically adjustable in order to dynamically adjust the reactance of the PRU 120 (the device reactance), in order to conform the device reactance (e.g., to present a target reactance) to a reactance range for the PTU 110 (the transmitter reactance), or to dynamically adjust the rectified voltage provided to the device electronics of the PRU 120. Note that since the reactance is being adjusted, the resonant frequency of the PRU 120 is not necessarily being matched to the resonant frequency of the PTU 110 in certain situations. For example, if attempting to match the resonant frequency would increase the reactance above a defined range (e.g., above j150 ohms), then adjusting the reactance (e.g., below j150 ohms) decreases the power transfer efficiency of the wireless power field. Further operational details are provided below.

Figure 2:
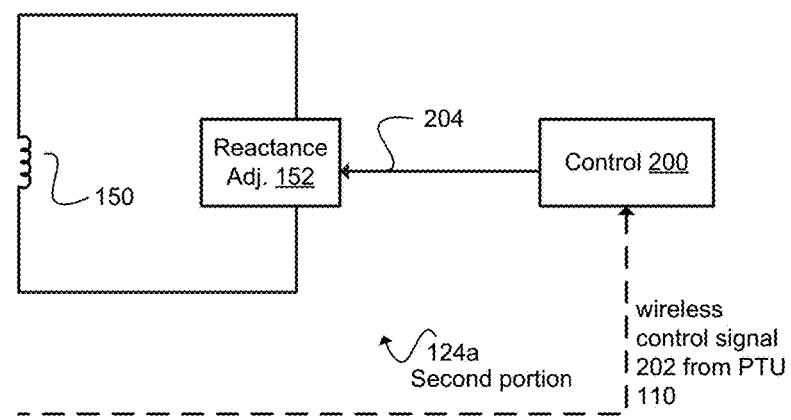
FIG. 2 is a schematic diagram showing additional details of the second portion (see FIG. 1).

FIG. 2 is a schematic diagram showing additional details of the second portion 124 (see FIG. 1), shown here as the second portion 124a, for controlling a reactance shift of the PRU 120 as presented to the PTU 110 (see FIG. 1). The second portion 124a is similar to the second portion 124 (see FIG. 1), and adds a control circuit 200. The control circuit 200 may be, for example, a microprocessor or a microcontroller. The control circuit 200 receives a control signal 202 (e.g., from the PTU 110 (see FIG. 1)), and in response thereto, dynamically adjusts the reactance of the reactance adjustment circuit 152 using the control signal 204. For example, the control signal 202 may instruct the control circuit 200 to increase the tank reactance, to decrease the tank reactance, etc. The control signal 202 may be communicated wirelessly, for example via Bluetooth™ Low Energy (BLE) signals.

As mentioned above, placing the PRU 120 in proximity to the PTU 110 will change the reactance presented by the transmitter coil 114 (see FIG. 1). There are two components of this reactance shift: a passive reactance shift and an active reactance shift. In the passive reactance shift, the metal and ferrite in the PRU 120 change the inductance of the transmitter coil 114. In the active reactance shift, the impedance seen by the first coil 132 is "reflected" to the transmitter coil 114 (see the details below). Note that the reflected resistance represents power delivered to the first coil 132.

The system 100 (see FIG. 1) uses the intentional reactance shift of the PRU's second coil 150 to compensate for the unintentional reactance shift of the PRU 120 (and, to a lesser extent, the unintentional reactance shift of the first coil 132). Equation 1 depicts the impedance shift created by the second coil 150:

$$Z_{refl\_aux} = \frac{(\omega\ M_{tx\_aux})^2}{j\omega\ L_{aux} + Z_{aux}}$$

where $Z_{refl\_aux}$ is the reflected impedance which appears in series with the transmitter coil 114, $M_{tx\_aux}$ is the mutual inductance between the PTU 110 and the second coil 150, $L_{aux}$ is the self-inductance of the second coil 150, and $Z_{aux}$ is the tank impedance on the second coil 150.

The control circuit 200 dynamically adjusts $Z_{aux}$ to control the reflected impedance, in response to the control signal 202. The components of the reactance adjustment circuit 152 that the control circuit 200 dynamically controls include switchable capacitors, switchable resistors, variable capacitors, etc. as further described below.

Figure 3:
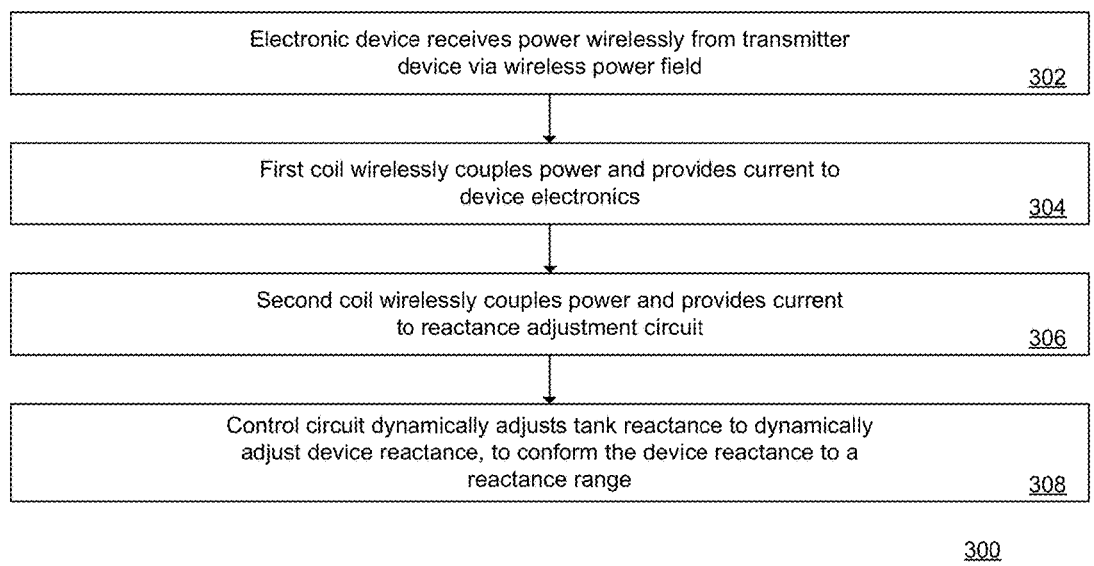
FIG. 3 is a flowchart of a method of performing reactance adjustment in a wireless charging system, for example to describe the operation of the PRU (see FIG. 1) and the second portion (see FIG. 2).

FIG. 3 is a flowchart of a method 300 of performing reactance adjustment in a wireless charging system, for example to describe the operation of the PRU 120 (see FIG. 1) and the second portion 124a (see FIG. 2). At 302, an electronic device receives power wirelessly from a transmitter device, via a wireless power field generated by the transmitter device. The electronic device has device electronics, a first coil coupled to the device electronics, a reactance adjustment circuit, a second coil coupled to the reactance adjustment circuit, and a control circuit coupled to the reactance adjustment circuit. For example, the electronic device may be the PRU 120 (see FIG. 1), which has device electronics (represented by the resistor 142, etc.), the first coil 132, the reactance adjustment circuit 152, the second coil 150, and the control circuit 200 (see FIG. 2). The PTU 110 (see FIG. 1) may generate the wireless power field, and the PRU 120 may receive power wirelessly via the wireless power field.

At 304, the first coil wirelessly couples the power and provides an electrical current based on the power to the device electronics. The device electronics and the first coil have a load impedance. The load impedance may include a load reactance. For example, the first coil 132 (see FIG. 1) wirelessly couples the power (via the wireless power field) and provides an electrical current based on the power to the device electronics (the resistor 142 representing the load, etc.).

At 306, the second coil wirelessly couples the power and provides an electrical current based on the power to the reactance adjustment circuit. The reactance adjustment circuit and the second coil have a tank impedance. The tank impedance may include a tank reactance. The tank reactance is adjustable. A device impedance includes the load impedance and the tank impedance, and a device reactance includes the load reactance and the tank reactance. For example, the second coil 150 (see FIG. 1) wirelessly couples the power (via the wireless power field) and provides an electrical current based on the power to the reactance adjustment circuit 152. The second coil 150 and the reactance adjustment circuit 152 have an adjustable reactance, referred to as the tank reactance, which is adjustable according to the control signal 204 (see FIG. 2).

At 308, the control circuit dynamically adjusts the tank reactance and in accordance therewith dynamically adjusts the device reactance. For example, the control circuit 200 (see FIG. 2) adjusts the reactance of the reactance adjustment circuit 152 using the control signal 204. Adjusting the reactance of the reactance adjustment circuit 152 adjusts the reactance of the second portion 124a, which adjusts the reactance of the PRU 120 (see FIG. 1).

The control circuit dynamically adjusts the tank reactance in order to conform the device reactance to a reactance range for the transmitter reactance of the transmitter device. The control circuit receives a control signal, and dynamically adjusts the tank reactance in response to the control signal. For example, the control circuit 200 (see FIG. 2) receives the control signal 202 from the PTU 110 (see FIG. 1), and adjusts the reactance of the reactance adjustment circuit 152, in order to conform the device reactance to a desired reactance range (e.g., from j0 to j150 ohms). As discussed above, in certain scenarios such adjustment of the tank reactance (e.g., conforming to the desired reactance range) may decrease the power transfer efficiency of the wireless power field.

The method 300 may further include adjusting, by a resonance matching circuit, the tank reactance in order to adjust a resonant frequency of the electronic device to match a resonant frequency of the transmitter device. The method 300 may further include deactivating, by the control circuit, the resonance matching circuit when the resonance matching circuit adjusts the device reactance outside of a defined range. These features are discussed in more detail with reference to FIG. 12.

Figure 4:
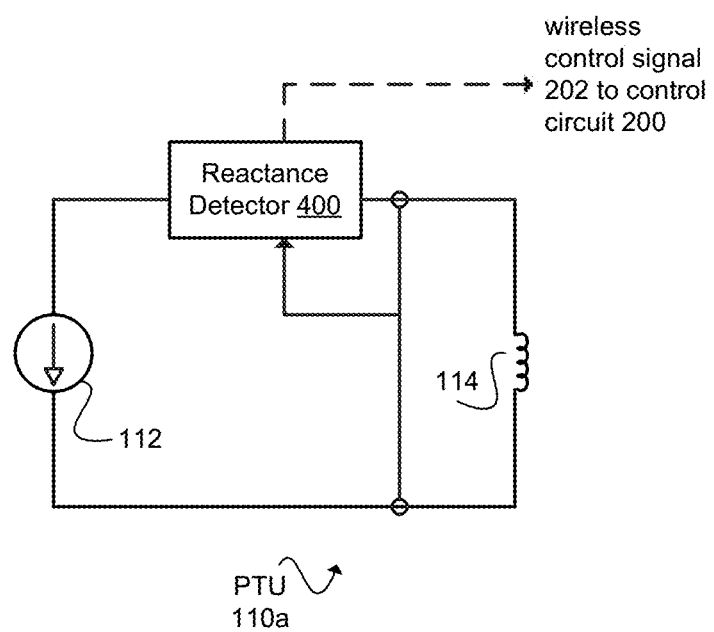
FIG. 4 is a schematic diagram of the power transmitting unit (PTU) (see FIG. 1) for generating the control signal (see FIG. 2).

FIG. 4 is a schematic diagram of the PTU 110 (see FIG. 1), shown here as the PTU 110a, for generating the control signal 202 (see FIG. 2). The PTU 110a is similar to the PTU 110 (see FIG. 1), and adds a reactance detector circuit 400. The reactance detector 400 may include a voltage detector to measure the opposition to the change in voltage across the transmitter coil 114 in order to determine the capacitive reactance, and may include a current detector to measure the opposition to the change of current through the transmitter coil 114 in order to determine the inductive reactance. The net reactance of the PTU 110a detected by the reactance detector 400 varies depending upon the PRU 120, as per Equation 1 above. The reactance detector 400 then determines, based on the detected reactance, the control signal appropriate for the control circuit 200 (see FIG. 2) to adjust the reactance adjustment circuit 152 appropriately, and provides the control signal to a transmitter (not shown; e.g., a Bluetooth™ Low Energy transmitter) to transmit as the control signal 202 to the control circuit 200.

Figure 5:
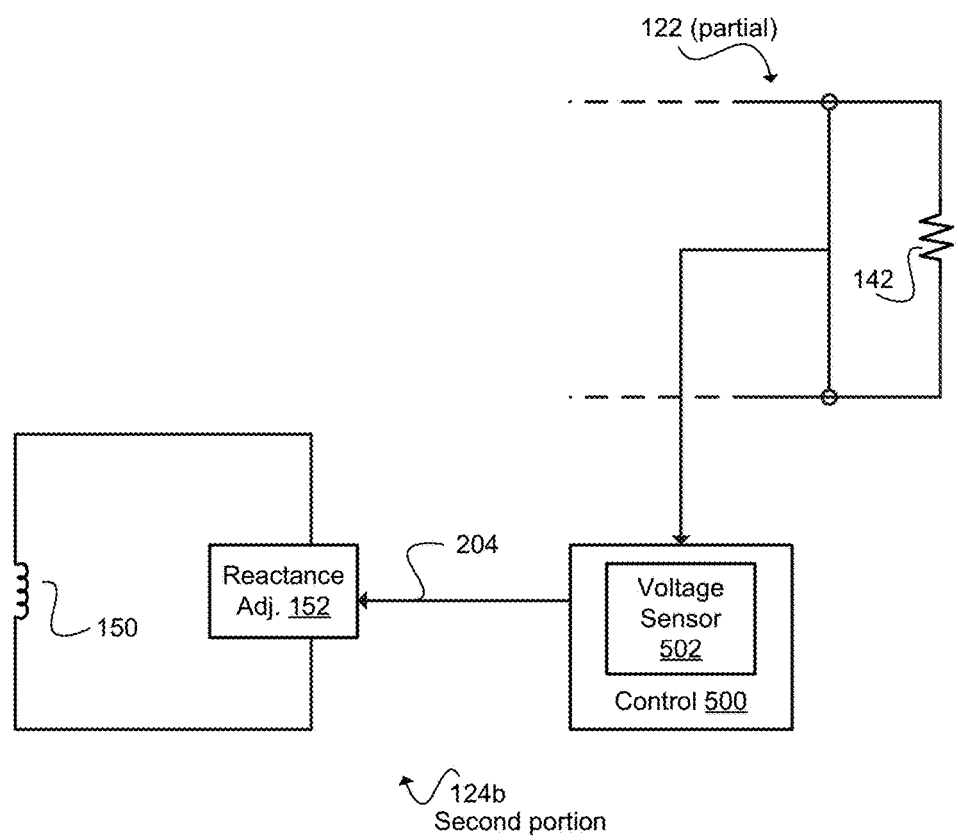
FIG. 5 is a schematic diagram showing additional details of the second portion (see FIG. 1) for controlling a received voltage of the PRU.

FIG. 5 is a schematic diagram showing additional details of the second portion 124 (see FIG. 1), shown here as the second portion 124b, for controlling a received voltage of the PRU 120. FIG. 5 also shows a portion of the first portion 122 (see FIG. 1), specifically the resistor 142 that represents the load of the PRU 120. The second portion 124b is similar to the second portion 124 (see FIG. 1), and adds a control circuit 500. The control circuit 500 includes a voltage sensor 502 to detect the rectified voltage of the power received wirelessly, as the voltage provided to the load of the PRU 120, as represented by the resistor 142. Based on the voltage detected, the control circuit 500 dynamically adjusts the reactance of the reactance adjustment circuit 152, which in turn dynamically adjusts the rectified voltage of the power received wirelessly and provided to the device electronics. Since the second coil 150 will likely also be coupled to the first coil 132 (see FIG. 1), the load resistance of the second coil 150 can be adjusted to control the rectified voltage of the PRU 120, independent of the current through the transmitter coil 114.

Figure 6:
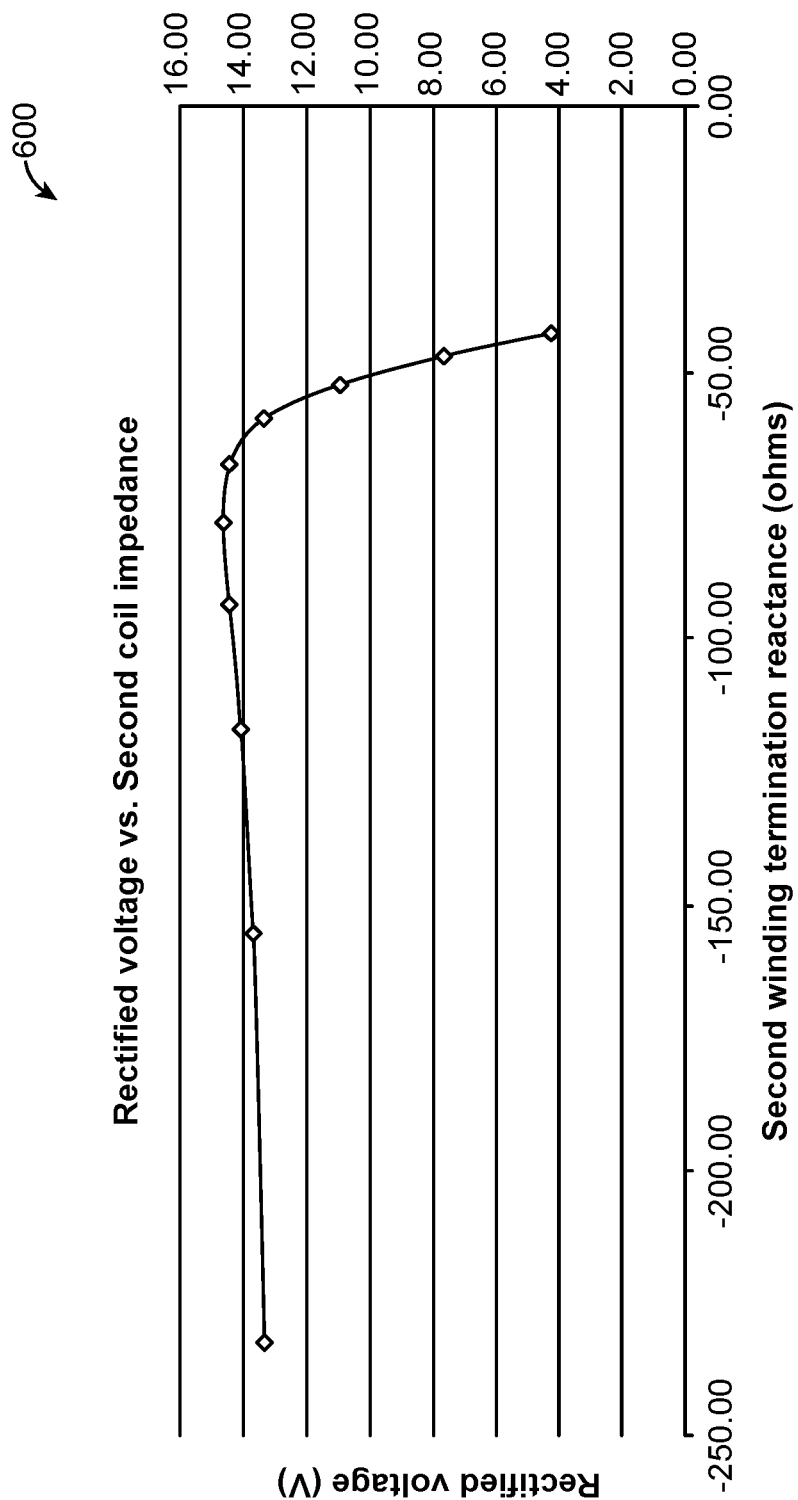
FIG. 6 is a graph showing an example of rectified voltage versus second coil impedance, for the second portion (see FIG. 5).

FIG. 6 is a graph 600 showing an example of rectified voltage versus second coil impedance, for the second portion 124b (see FIG. 5). In the graph 600, the x-axis is the impedance of the second coil 150 (see FIG. 5), also referred to as the second winding termination reactance; and the y-axis is the rectified voltage, for example as provided to the load of the PRU 120 (e.g., as represented by the resistor 142 in FIG. 5). In this example, the impedance of the second coil 150 is assumed to be purely reactive. As can be seen in the graph 600, adjusting the reactance (x-axis) of the second coil 150 between about −j40 ohms and −j80 ohms allows for controlling the rectified voltage between about 4 volts and 14 volts.

Figure 7:
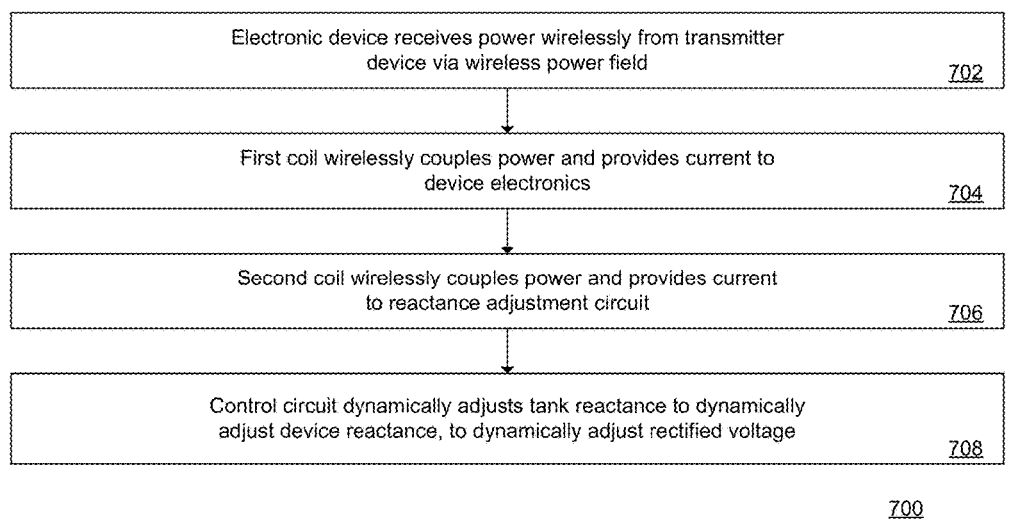
FIG. 7 is a flowchart of a method of performing reactance adjustment in a wireless charging system, for example to describe the operation of the PRU (see FIG. 1) and the second portion (see FIG. 5).

FIG. 7 is a flowchart of a method 300 of performing reactance adjustment in a wireless charging system, for example to describe the operation of the PRU 120 (see FIG. 1) and the second portion 124b (see FIG. 5). At 702, an electronic device receives power wirelessly from a transmitter device, via a wireless power field generated by the transmitter device. The electronic device has device electronics, a first coil coupled to the device electronics, a reactance adjustment circuit, a second coil coupled to the reactance adjustment circuit, and a control circuit coupled to the reactance adjustment circuit. For example, the electronic device may be the PRU 120 (see FIG. 1), which has device electronics (represented by the resistor 142, etc.), the first coil 132, the reactance adjustment circuit 152 (see FIG. 5), the second coil 150, and the control circuit 500 (see FIG. 5). The PTU 110 (see FIG. 1) may generate the wireless power field, and the PRU 120 may receive power wirelessly via the wireless power field.

At 704, the first coil wirelessly couples the power and provides an electrical current based on the power to the device electronics. The device electronics and the first coil have a load impedance. The load impedance may include a load reactance. For example, the first coil 132 (see FIG. 1) wirelessly couples the power (via the wireless power field) and provides an electrical current based on the power to the device electronics (the resistor 142 representing the load, etc.).

At 706, the second coil wirelessly couples the power and provides an electrical current based on the power to the reactance adjustment circuit. The reactance adjustment circuit and the second coil have a tank impedance. The tank impedance may include a tank reactance. The tank reactance is adjustable. A device impedance includes the load impedance and the tank impedance, and a device reactance includes the load reactance and the tank reactance. For example, the second coil 150 (see FIG. 1) wirelessly couples the power (via the wireless power field) and provides an electrical current based on the power to the reactance adjustment circuit 152. The second coil 150 and the reactance adjustment circuit 152 have an adjustable reactance, referred to as the tank reactance, which is adjustable according to the control signal 204 (see FIG. 5).

At 708, the control circuit dynamically adjusts the tank reactance and in accordance therewith dynamically adjusts the device reactance. For example, the control circuit 500 (see FIG. 5) adjusts the reactance of the reactance adjustment circuit 152 using the control signal 204. Adjusting the reactance of the reactance adjustment circuit 152 adjusts the reactance of the second portion 124b, which adjusts the reactance of the PRU 120 (see FIG. 1).

The control circuit dynamically adjusts the tank reactance in order to dynamically adjust a rectified voltage of the wireless power signal provided to the device electronics. The control circuit includes a voltage sensor that senses the rectified voltage and provides a voltage measurement to the control circuit. The control circuit receives the voltage measurement signal, and dynamically adjusts the tank reactance in response to the voltage measurement signal. For example, the control circuit 500 (see FIG. 5, including the voltage sensor 502) measures the rectified voltage provided to the device electronics (the load of the PRU 120, represented by the resistor 142), and adjusts the reactance of the reactance adjustment circuit 152, in order to dynamically adjust the rectified voltage (e.g., between 4 and 14 volts).

The method 700 may further include adjusting, by a resonance matching circuit, the tank reactance in order to adjust a resonant frequency of the electronic device to match a resonant frequency of the transmitter device. The method 700 may further include deactivating, by the control circuit, the resonance matching circuit when the resonance matching circuit adjusts the device reactance outside of a defined range. These features are discussed in more detail with reference to FIG. 12.

Figure 8:
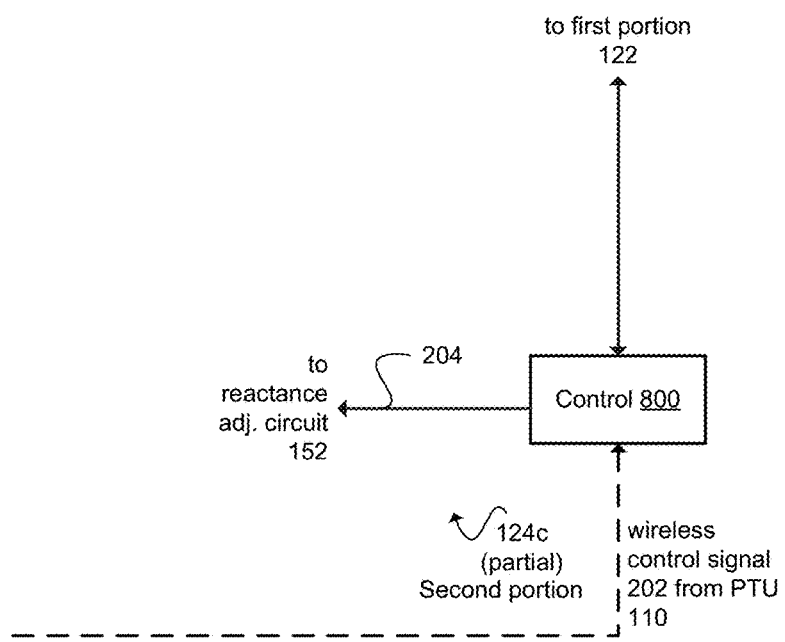
FIG. 8 is a block diagram of a control circuit for controlling both a reactance shift and a received voltage.

FIG. 8 is a block diagram of a control circuit 800 for controlling both a reactance shift and a received voltage. The control circuit 800 is implemented in the second portion 124 (see FIG. 1), referred to as the second portion 124c here (partially shown in FIG. 8). The control circuit 800 includes the functionality of the control circuit 200 (see FIG. 2) and the control circuit 500 (see FIG. 5). Components similar to those in FIG. 2 and FIG. 5 are not shown. The control circuit 800 receives the wireless control signal 202, and operates as described above regarding the control circuit 200. The control circuit 800 measures the rectified voltage from the first portion 122, and operates as described above regarding the control circuit 500. The control signal 202, in addition to the functionality described above regarding FIG. 2, also selectively controls the mode of operation of the control circuit 800. In one mode of operation, the control circuit 800 operates to perform a reactance shift as per the control circuit 200, and the functionality of the control circuit 500 is not used. In another mode of operation, the control circuit 800 operates to control the received voltage as per the control circuit 500, and the functionality of the control circuit 200 is not used.

Alternatively, the control circuit 800 (or 200 of FIG. 2 or 500 of FIG. 5) may include other functionality such as operating as the control circuit for the PRU 120 (see FIG. 1) generally, in which case the placement of the control circuit 800 is not limited to the second portion (e.g., 124a of FIG. 2 or 124b of FIG. 5 or 124c of FIG. 8). The control circuit 800 (or 200 of FIG. 2 or 500 of FIG. 5) may be a microprocessor, microcontroller, etc.

Figure 9:
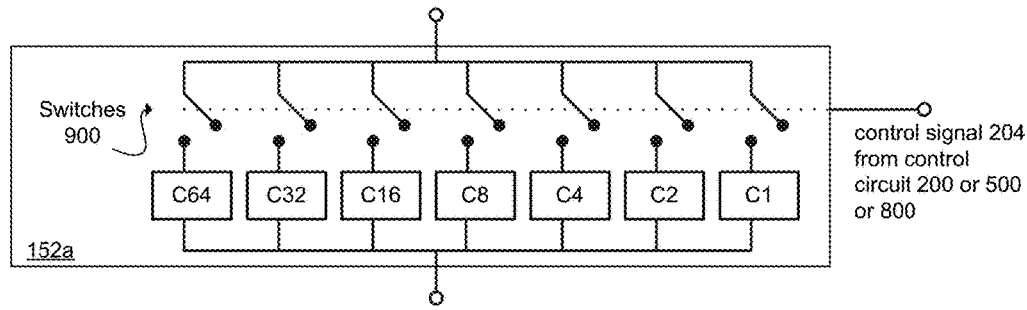
FIG. 9 is a block diagram showing a reactance adjustment circuit that has switchable capacitors.
Figure 10:
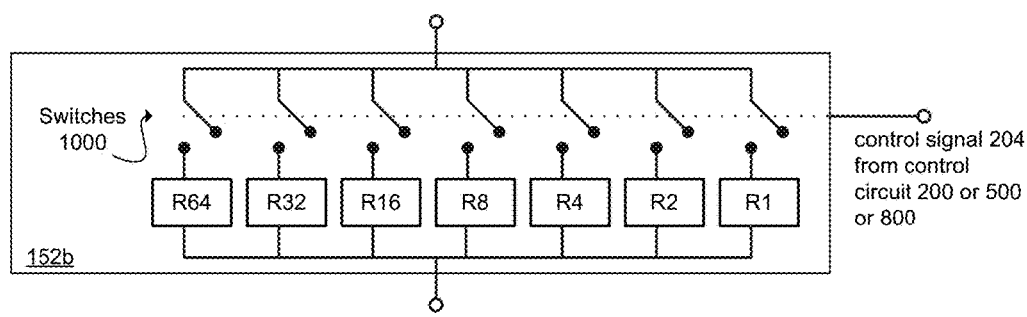
FIG. 10 is a block diagram showing a reactance adjustment circuit that has switchable resistors.
Figure 11:
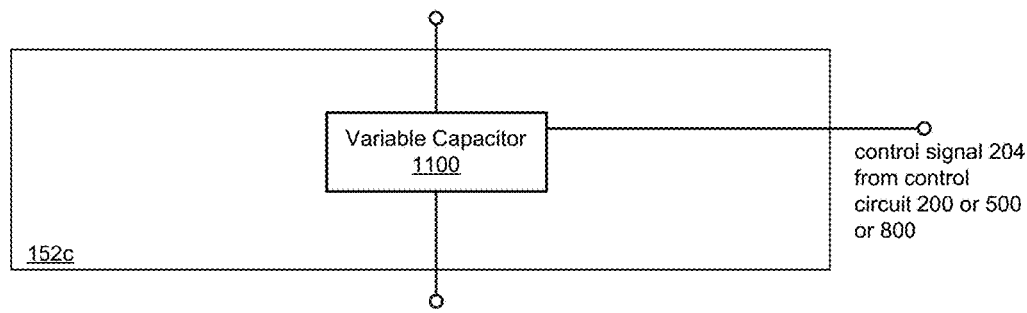
FIG. 11 is a block diagram showing a reactance adjustment circuit that has a variable capacitor.

FIGS. 9-11 are block diagrams showing implementation options for the reactance adjustment circuit 152 (see FIG. 1). FIG. 9 is a block diagram showing a reactance adjustment circuit 152a that has switchable capacitors. The switchable capacitors include a number of switches 900 and capacitors C1, C2, C4, C8, C16, C32 and C64. The switches 900 are controlled by the control signal 204 (e.g., from the control circuit 200 of FIG. 2, 500 of FIG. 5, or 800 from FIG. 8). The switches 900 selectively connect or disconnect the capacitors from the circuit. The switches 900 may be implemented with transistors. The capacitors are configured in a binary range. For example, C1 is 1 picofarad, C2 is 2 picofarads, etc.; thus the selectable range is the 128 values from 0 to 127 picofarads. Switching the capacitors adjusts the capacitance, which adjusts the reactance of the reactance adjustment circuit 152a, as described above regarding the reactance adjustment circuit 152.

FIG. 10 is a block diagram showing a reactance adjustment circuit 152b that has switchable resistors. The switchable resistors include a number of switches 1000 and resistors R1, R2, R4, R8, R16, R32 and R64. The switches 1000 are controlled by the control signal 204 (e.g., from the control circuit 200 of FIG. 2, 500 of FIG. 5, or 800 from FIG. 8). The switches 1000 selectively connect or disconnect the resistors from the circuit. The switches 1000 may be implemented with transistors. The resistors are configured in a binary range. For example, R1 is 1 kilo-ohm, R2 is 2 kilo-ohms, etc.; thus the selectable range is the 128 values from 0 to 127 kilo-ohms. Switching the resistors adjusts the impedance, which adjusts the reactance of the reactance adjustment circuit 152b, as described above regarding the reactance adjustment circuit 152.

FIG. 11 is a block diagram showing a reactance adjustment circuit 152c that has a variable capacitor 1100. The variable capacitor 1100 controlled by the control signal 204 (e.g., from the control circuit 200 of FIG. 2, 500 of FIG. 5, or 800 from FIG. 8). The control signal 204 selects one of the selectable capacitances of the variable capacitor 1100, which adjusts the reactance of the reactance adjustment circuit 152c, as described above regarding the reactance adjustment circuit 152. As a further option, more than one variable capacitor may be implemented in parallel (similar to the arrangement in FIG. 9 or FIG. 10), with the control signal 204 adjusting one or more of the variable capacitors in order to adjust the reactance.

Figure 12:
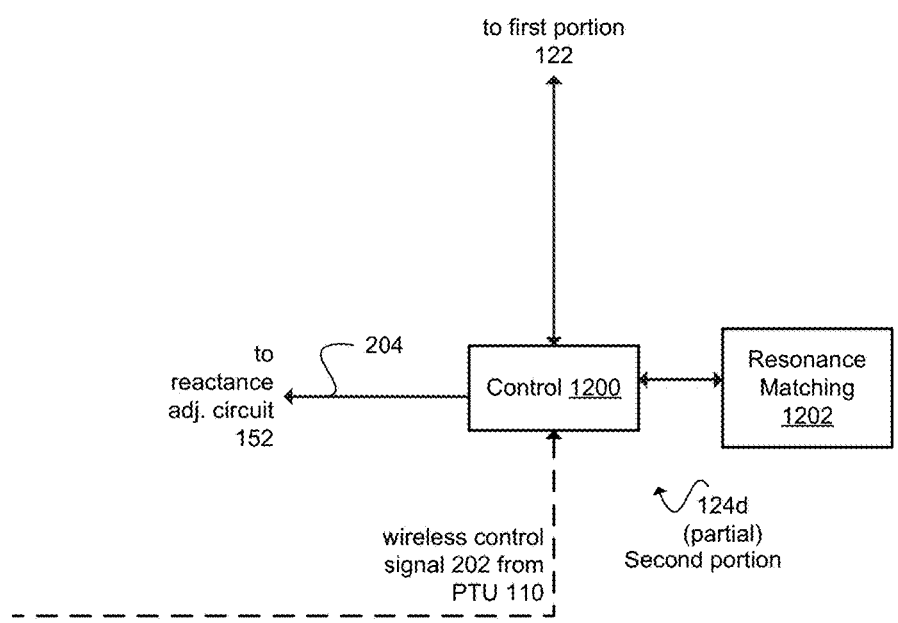
FIG. 12 is a block diagram of a control circuit that includes a resonance matching circuit.
Figure 13:
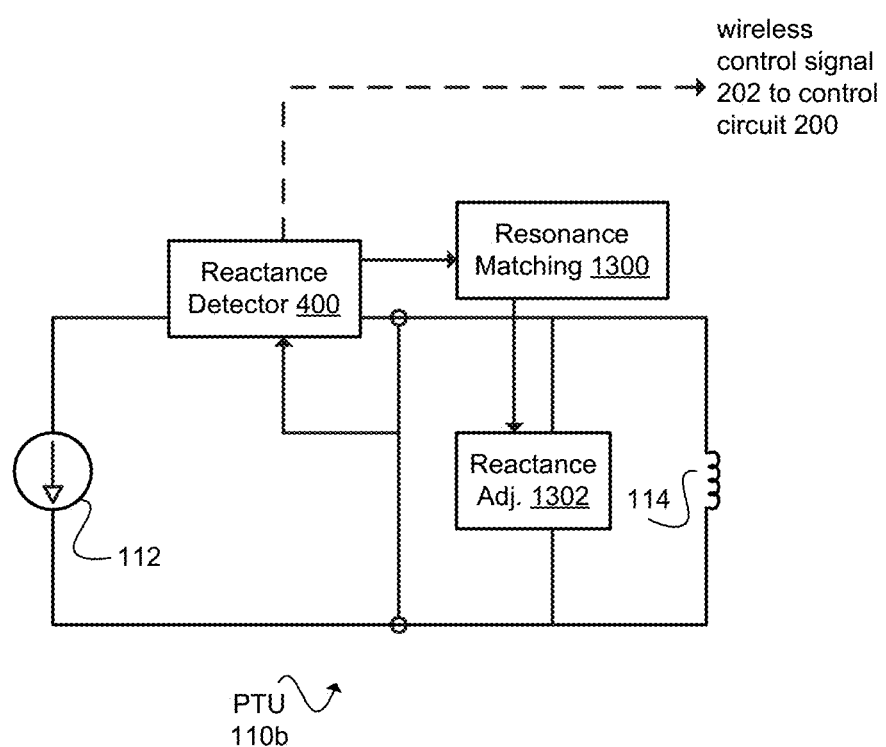
FIG. 13 is a block diagram of a PTU that includes a resonance matching circuit.

FIGS. 12-13 illustrate how the reactance adjustment systems described above may be used in conjunction with resonance matching. As described above, some wireless charging systems use resonance matching to increase the power transfer efficiency of the wireless power field. Thus, performing reactance adjustment, for example when resonance matching would increase the reactance outside of a defined range, decreases the power transfer efficiency. (However, as described above, this can help to simplify the design or cost of the PTU, since it is not required to operate over a wide reactance range.)

FIG. 12 is a block diagram of a control circuit 1200 that includes a resonance matching circuit 1202. The control circuit 1200 is implemented in the second portion 124 (see FIG. 1), referred to as the second portion 124d here (partially shown in FIG. 12). The control circuit 1200 is similar to the control circuit 200 of FIG. 2 (or 500 of FIG. 5 or 800 of FIG. 8), and is a component of the PRU 120 (see FIG. 1). For brevity, the control circuit 1200 is shown as being similar to the control circuit 800, with the understanding that if the control circuit 200 or 500 is implemented, then the unrelated components may be omitted.

In a first mode of operation, the control circuit 1200 allows the resonance matching circuit 1202 to perform resonance matching, in order for the resonant frequency of the PRU 120 (see FIG. 1) to match the resonant frequency of the PTU 110 (or more specifically, matching resonance between the PTU coil 114 and the PRU coils 132 and 150). For example, the resonance matching circuit 1202 may be coupled to the reactance adjustment circuit 152 via the control circuit 1200. The resonance matching circuit 1202 may adjust the reactance of the reactance adjustment circuit 152 in order to sweep through resonant frequencies, and may stop adjusting when an increased power transfer efficiency has been reached. However, if the resonance matching circuit 1202 adjusts the reactance of the reactance adjustment circuit 152 such that the reactance of the PRU 120 adjusts outside of a defined range (e.g., outside of j0 to j150 ohms), the control circuit 1200 enters a second mode of operation.

In the second mode of operation, the control circuit 1200 deactivates the resonance matching circuit 1202. The control circuit 1200 then operates to perform reactance adjustment as described above (e.g., as per the control circuit 200 of FIG. 2, 500 of FIG. 5, or 800 of FIG. 8).

FIG. 13 is a block diagram of a PTU 110b that includes a resonance matching circuit 1300. The PTU 110b is similar to the PTU 110 (see FIG. 1) or the PTU 110a (see FIG. 4). The resonance matching circuit 1300 is coupled to the reactance detector 400 (see FIG. 4) and a transmitter reactance adjustment circuit 1302. The transmitter reactance adjustment circuit 1302 may be similar to the reactance adjustment circuit 152 (see FIG. 1), and may include switchable capacitors (see FIG. 9), switchable resistors (see FIG. 10), or a variable capacitor (see FIG. 11). The resonance matching circuit 1300 uses the capacitive reactance and inductive reactance determined by the reactance detector 400 to adjust the reactance of the transmitter reactance adjustment circuit 1302.

In a first mode of operation, the reactance detector 400 does not generate the wireless control signal 202; instead, the reactance detector 400 allows the resonance matching circuit 1300 to perform resonance matching, in order for the resonant frequency of the PTU 110b to match the resonant frequency of the PRU 120 (see FIG. 1). The reactance detector 400 sends the measured transmitter reactance (as described above regarding FIG. 4) to the resonance matching circuit 1300. The resonance matching circuit 1300 may adjust the reactance of the transmitter reactance adjustment circuit 1302 in order to sweep through resonant frequencies, and may stop adjusting when an increased power transfer efficiency has been reached. However, if the resonance matching circuit 1300 adjusts the reactance of the transmitter reactance adjustment circuit 1302 such that the reactance of the PTU 110 adjusts outside of a defined range (e.g., outside of j0 to j150 ohms), the PTU 110b enters a second mode of operation.

In the second mode of operation, the reactance detector 400 deactivates the resonance matching circuit 1300 and operates to perform reactance adjustment as described above regarding FIG. 4.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. An electronic device, comprising:
   device electronics;
   a first coil, coupled to the device electronics, wherein the first coil is configured to wirelessly couple power via a wireless power field generated by a transmitter device and to provide a first electrical current based on the power to the device electronics, wherein the device electronics and the first coil have a load impedance, wherein the load impedance includes a load reactance;
   a reactance adjustment circuit;
   a second coil, coupled to the reactance adjustment circuit, wherein the second coil is isolated from the first coil and configured to wirelessly couple the power via the wireless power field generated by the transmitter device and to provide a second electrical current based on the power to the reactance adjustment circuit to adjust device reactance of the electronic device presented to the transmitter device so as to control reflected impedance from the electronic device to the transmitter device, wherein the reactance adjustment circuit and the second coil have a tank impedance, wherein the tank impedance includes a tank reactance, wherein the tank reactance is adjustable, wherein a device impedance includes the load impedance and the tank impedance, and wherein the device reactance includes the load reactance and the tank reactance; and
   a control circuit, coupled to the reactance adjustment circuit, that is configured to dynamically adjust the tank reactance and in accordance therewith to dynamically adjust the device reactance.

2. The electronic device of claim 1, wherein the transmitter device has a transmitter impedance, wherein the transmitter impedance includes a transmitter reactance,
   wherein the control circuit is configured to dynamically adjust the tank reactance in order to conform the device reactance to a reactance range for the transmitter reactance of the transmitter device.

3. The electronic device of claim 2, wherein the control circuit is configured to receive a control signal from the transmitter device, and to dynamically adjust the tank reactance in response to the control signal.

4. The electronic device of claim 1, wherein the control circuit is configured to dynamically adjust the tank reactance in order to dynamically adjust a rectified voltage of the power provided to the device electronics.

5. The electronic device of claim 4, further comprising:
   a voltage sensor, coupled to the device electronics, that is configured to sense the rectified voltage, and to provide a voltage measurement signal to the control circuit,
   wherein the control circuit is configured to receive the voltage measurement signal, and to dynamically adjust the tank reactance in response to the voltage measurement signal.

6. The electronic device of claim 1, wherein the transmitter device includes a transmitter impedance, wherein the transmitter impedance includes a transmitter reactance, wherein the control circuit is configured to selectively operate in a first mode and a second mode, according to a control signal,
   wherein in the first mode the control circuit dynamically adjusts the tank reactance in order to conform the device reactance to a reactance range for the transmitter reactance of the transmitter device, and
   wherein in the second mode the control circuit dynamically adjusts the tank reactance in order to dynamically adjust a rectified voltage of the power provided to the device electronics.

7. The electronic device of claim 1, further comprising:
   a resonance matching circuit, coupled to the reactance adjustment circuit, that is configured to adjust the tank reactance in order to adjust a resonant frequency of the electronic device to match a resonant frequency of the transmitter device,
   wherein the control circuit is configured to deactivate the resonance matching circuit when the resonance matching circuit adjusts the device reactance outside of a defined range.

8. The electronic device of claim 1, wherein the control circuit is configured to dynamically adjust the tank reactance such that a power transfer efficiency of the wireless power field is decreased.

9. The electronic device of claim 1, further comprising:
   a voltage sensor that is configured to detect a rectified voltage of the power provided to the device electronics, wherein the control circuit is configured to dynamically adjust the tank reactance based on the rectified voltage.

10. The electronic device of claim 1, wherein the reactance adjustment circuit comprises:
    a plurality of capacitors; and
    a plurality of switches, coupled to the plurality of capacitors, that is configured to receive a control signal from the control circuit and to selectively connect at least one of the plurality of capacitors in response to the control signal.

11. The electronic device of claim 1, wherein the reactance adjustment circuit comprises:
    a plurality of resistors; and
    a plurality of switches, coupled to the plurality of resistors, that is configured to receive a control signal from the control circuit and to selectively connect at least one of the plurality of resistors in response to the control signal.

12. The electronic device of claim 1, wherein the reactance adjustment circuit comprises:
    a variable capacitor that has a plurality of selectable capacitances, wherein the variable capacitor is configured to receive a control signal from the control circuit and to select one of the plurality of selectable capacitances in response to the control signal.

13. A method of performing reactance adjustment in a wireless charging system, comprising:
    receiving power wirelessly, by an electronic device from a transmitter device, via a wireless power field generated by the transmitter device, wherein the electronic device has device electronics, a first coil coupled to the device electronics, a reactance adjustment circuit, a second coil coupled to the reactance adjustment circuit, and a control circuit coupled to the reactance adjustment circuit;
    wirelessly coupling the power and providing, by the first coil, a first electrical current based on the power to the device electronics, wherein the device electronics and the first coil have a load impedance, wherein the load impedance includes a load reactance;
    wirelessly coupling the power and providing, by the second coil, isolated from the first coil, a second electrical current based on the power to the reactance adjustment circuit to adjust device reactance of the electronic device presented to the transmitter device so as to control reflected impedance from the electronic device to the transmitter device, wherein the reactance adjustment circuit and the second coil have a tank impedance, wherein the tank impedance includes a tank reactance, wherein the tank reactance is adjustable, wherein a device impedance includes the load impedance and the tank impedance, and wherein the device reactance includes the load reactance and the tank reactance; and dynamically adjusting, by the control circuit, the tank reactance and in accordance therewith dynamically adjusting the device reactance.

14. The method of claim 13, wherein the electronic device further comprises a resonance matching circuit, wherein the resonance matching circuit is coupled to the reactance adjustment circuit, the method further comprising:

adjusting, by the resonance matching circuit, the tank reactance in order to adjust a resonant frequency of the electronic device to match a resonant frequency of the transmitter device; and deactivating, by the control circuit, the resonance matching circuit when the resonance matching circuit adjusts the device reactance outside of a defined range.

15. The method of claim 13, further comprising:

dynamically adjusting, by the control circuit, the tank reactance such that a power transfer efficiency of the wireless power field is decreased.

16. A system, comprising:

a transmitter device, including a transmitter coil, wherein the transmitter device is configured to generate a wireless power field; and an electronic device, comprising:

device electronics, a first coil, coupled to the device electronics, wherein the first coil is configured to wirelessly couple power via the wireless power field generated by the transmitter device and to provide a first electrical current based on the power to the device electronics, wherein the device electronics and the first coil have a load impedance, wherein the load impedance includes a load reactance, a reactance adjustment circuit, a second coil, coupled to the reactance adjustment circuit, wherein the second coil is isolated from the first coil and configured to wirelessly couple the power via the wireless power field generated by the transmitter device and to provide a second electrical current based on the power to the reactance adjustment circuit, to adjust device reactance of the electronic device presented to the transmitter device so as to control reflected impedance from the electronic device to the transmitter device wherein the reactance adjustment circuit and the second coil have a tank impedance, wherein the tank impedance includes a tank reactance, wherein the tank reactance is adjustable, wherein a device impedance includes the load impedance and the tank impedance, and wherein the device reactance includes the load reactance and the tank reactance, and a control circuit, coupled to the reactance adjustment circuit, that is configured to dynamically adjust the tank reactance and in accordance therewith to dynamically adjust the device reactance.

17. The system of claim 16, wherein the transmitter device has a transmitter impedance, wherein the transmitter impedance includes a transmitter reactance, and wherein the transmitter device further comprises:

a reactance detector circuit, coupled to the transmitter coil, that is configured to detect the transmitter reactance and to transmit a control signal to the control circuit, wherein the control circuit is configured to dynamically adjust the tank reactance in response to the control signal.

18. The system of claim 16, wherein the transmitter device has a transmitter impedance, wherein the transmitter impedance includes a transmitter reactance, and wherein the transmitter device further comprises:

a reactance detector circuit, coupled to the transmitter coil, that is configured to detect the transmitter reactance;

a transmitter reactance adjustment circuit, coupled to the transmitter coil, wherein the transmitter reactance adjustment circuit has a transmitter tank reactance, wherein the transmitter reactance includes the transmitter tank reactance, wherein the transmitter tank reactance is adjustable; and a resonance matching circuit, coupled to the reactance detector circuit and the transmitter reactance adjustment circuit, that is configured to adjust the transmitter tank reactance in order to adjust a resonant frequency of the transmitter device to match a resonant frequency of the electronic device, wherein the reactance detector circuit is configured to deactivate the resonance matching circuit when the resonance matching circuit adjusts the transmitter reactance outside of a defined range.

19. The system of claim 16, wherein the electronic device further comprises:

a resonance matching circuit, coupled to the reactance adjustment circuit, that is configured to adjust the tank reactance in order to adjust a resonant frequency of the electronic device to match a resonant frequency of the transmitter device, wherein the control circuit is configured to deactivate the resonance matching circuit when the resonance matching circuit adjusts the device reactance outside of a defined range.

20. The system of claim 16, wherein the control circuit is configured to dynamically adjust the tank reactance such that a power transfer efficiency of the wireless power field is decreased.

* * * * *